United States Patent Office 3,840,649
Patented Oct. 8, 1974

3,840,649
CARBON FIBER FROM ORIENTED VINYLIDENE HALIDE POLYMERS
Darrell C. Feay, Orinda, and Harvey D. Ledbetter, Walnut Creek, Calif., assignors to The Dow Chemical Company, Midland, Mich.
No Drawing. Filed Oct. 29, 1971, Ser. No. 193,696
Int. Cl. C01b 31/04, 31/07
U.S. Cl. 423—447                                         7 Claims

ABSTRACT OF THE DISCLOSURE

A process for preparing carbonaceous fibers useful as reinforcement for plastic or metal materials by (1) partially dehydrohalogenating a vinylidene halide polymer filament by reaction with an organic nitrogen base material without significant destruction of filament structural integrity, then (2) heating the partially dehydrohalogenated polymer filament under specified carbonizing temperatures.

BACKGROUND OF THE INVENTION

It is known that vinylidene chloride polymers are capable of being carbonized. In this regard, U.S. Pat. 3,516,791 discloses a method of carbonizing polyvinylidene chloride in powder or film form wherein the polymer is initially at least partially dehydrohalogenated by treatment with an alkali metal amide in liquid ammonia. The materials produced are highly porous and adsorptive and are thus useful as molecular sieves. Such materials, however, are not useful for the type of reinforcement of plastic or metal materials where carbon fibers are employed.

It is also known to prepare carbon fibers by controlled thermal decomposition of fibers prepared from copolymers of vinylidene chloride and vinyl chloride, e.g., as set forth in the article entitled Preparation and Structure of Saran-Carbon Fibers, by E. A. Boucher, R. N. Cooper and D. H. Everett, published in Carbon, 1970, vol. 8, pp. 597–605.

Utilization of thermal dehydrohalogenation techniques are generally undesirable due to a difficultly controlled initiation of the dehydrohalogenation reaction with accompanying lack of reproducibility in results and subsequent melting and burning of the fiber.

It is also known that vinylidene chloride polymer, in film form, may be discolored by reaction with amines, e.g., as set forth in Kogyo Kagaku Zasshi, 71 (8), 1272–1276 (1968).

Heretofore, however, a practical method of preparing carbonaceous fibers from vinylidene halide polymer filaments, which fibers are useful as reinforcement for plastic or metal materials, has not been known.

SUMMARY

Carbonaceous fibers which are particularly useful as reinforcement for plastic materials are prepared by a process comprising the sequential steps of:
(1) Treating an oriented vinylidene halide polymer filament with an organic nitrogen base material at a temperature less than about 125° C. in the essential absence of moisture until the filament is from about 25 to 80 percent dehydrohalogenated but without significant loss in filament structural integrity, and
(2) Subjecting the filament to a temperature which is increased from an initial value of at least about 90° C. to a final value of up to about 1500° C. over a period of at least 5 minutes.

DESCRIPTION OF THE PREFERRED EMBODIMENTS

Filiaments, and the like, can be fabricated from the polymer of pure vinylidene chloride or copolymers of vinylidene chloride and vinylidene bromide or copolymers thereof with other polymerizable materials wherein the portion of vinylidene halide is at least above about 60 percent and preferably above about 80 percent by weight. These polymers are crystalline and show the characteristic X-ray diffraction patterns known as "fiber patterns." These fiber patterns occur when a polycrystalline body is made up of a collection of single crystals all having one crystal axis essentially parallel to one direction called the fiber axis but with the other two axis oriented at random from one crystal to the next. Although the complete structure of polyvinylidene chloride has not been precisely determined, all researchers agree that the polymer chain lies along one axis (usually called the monoclinic b-axis) parallel to the fiber direction. Articles so characterized have a higher tensile strength in the fiber direction than unoriented bodies.

Most of the materials copolymerizable with vinylidene halides do not in themselves exhibit characteristic X-ray patterns and many of the copolymers of the vinylidene halides containing large proportions of these materials are similarly incapable of being drawn into strong, pliable articles. There is, then, an upper limit of the amount of material copolymerized with the vinylidene halides for the purposes of the present invention. In the case of most copolymers of such vinylidene halides, there should be no greater than about 40, and usually less than 15 to 20 percent of the other polymerizable component. The copolymerizable materials include vinyl chloride, vinyl acetate, styrene, ethyl acrylate, acrylonitrile, methyl acrylate, methyl methacrylate, and many other copolymerizable compounds.

In the process of the present invention the vinylidene halide polymer filament is initially treated at a temperature of less than 125° C. with an organic nitrogen base to induce dehydrohalogenation with resultant creation of carbon to carbon double bonds along each polymer chain. This treatment permits dehydrohalogenation of the vinylidene halide polymer filament to be rapidly completed (by heating) without loss of the structural integrity of the filament.

In this regard, it has been found that any organic nitrogen base which blackens an oriented vinylidene halide polymer filament or film which is immersed in it at a temperature of about 50° C. in about 60 minutes or less may be used. Exemplary of the preferred bases are the organic nitrogen bases such as amines having the formula R—$NH_2$ wherein R is alkyl or alkenyl containing from 1 to 4 carbon atoms, such as methyl amine, ethyl amine, propyl, allyl and butyl amines. Also preferred is the cyclic imine, pyrrolidine. Other materials which may be used include the guanidines such as guanidine, 1-amino guanidine, tetramethyl guanidine and diethyl guanidines; aziridines; aromatic and nonaromatic N-heterocycles; methyl hydrazines; and the alkanol amines such as 3-amino-1-propanol, 1-amino-2-propanol, 2-amino ethanol and pyrrole.

The nitrogen base treatment may be accomplished by immersing the filament in a liquid base material as such, or in admixture with an inert diluent, or by exposing the filament to a gaseous base material. When using liquid nitrogen base materials, such materials are generally maintained at a temperature of from about 20° C. to 50° C. with a residence time of the filament in the base material generally ranging from about 0.1 to 30 minutes, depending on temperature, filament diameter and the base used. It is also preferable to conduct the dehydrohalogenation reaction in the essential absence of contact between the nitrogen base material and moisture for optimum efficiency. It is also preferable that the fiber is rinsed with a solvent, such as isopropyl alcohol, upon removal from the nitrogen base bath.

The partially dehydrohalogenated filament is then heated, under a temperature which is increased from an initial value of at least about 90° C. over a period of at least 5 minutes to a final value of up to 1500° C.

The carbon fibers optionally can then be graphitized to any desired extent by heating the carbon fiber to a temperature between about 1500° C. and 3000° C. Generally, the carbon fiber requires exposure to such temperature for a period of at least about 10 seconds. In the use of electrical self-heating of a carbon fiber tow, care should be taken to have a sufficient number of fibers present in order to generate the needed graphitization temperatures. For example, a single 0.010 inch diameter fiber is enough at 30 volts, applied potential, but about 10 or 15 fibers are needed, even at 140 volts applied potential, if the diameter is 0.0015 inch.

It is often desirable to maintain the filament under shrink resisting tension, particularly when such filament is heated to temperatures above about 100° C. Further, it may be desirable to apply tension sufficient to elongate the filament somewhat during the carbonization thereof.

It is to be understood that the process of this invention may be conducted batchwise or in a continuous manner utilizing conventionally employed equipment.

The following nonlimiting examples will further serve to illustrate the invention.

EXAMPLE I

The following individual experiments were conducted as follows:

Series I

Batch dehydrochlorination reactions on 0.010 inch diameter monofilament of a copolymer of about 85 weight percent vinylidene chloride and about 15 weight percent vinyl chloride.

Each sample was individually wound onto a glass frame and immersed in one of several chemical treatment compounds for specified times at specified temperatures.

The following Table I sets forth the chemical treating compounds used, the dehydrochlorination reaction conditions used and the extent of reaction.

Each of the polymer filaments designated as Sample Nos. 1 through 10 (with the exception of Sample No. 9) on Table I supra, were subsequently heated in the presence of nitrogen from a temperature of from 90° C. to 1000° C. over a period of about 70 minutes. The filament designated as Sample No. 1 (non-dehydrohalogenated) melted before carbonizing. By way of comparison, each of the filaments designated as Sample Nos. 2 through 8 and Sample No. 10 formed strong, flexible carbon fibers.

Series II

Batch dehydrochlorination reactions on separate 0.0015 inch diameter 30 filament tow samples of same copolymer as Series I, wherein each sample was dehydrochlorinated as set forth on the following Table II.

TABLE II
Batch dehydrochlorination reactions on a thirty filament tow of oriented vinylidene chloride polymer (0.0015 inch diameter)
Series II

| | Chemical treatment | | | Properties of dehydrochlorinated filament | | | | | |
|---|---|---|---|---|---|---|---|---|---|
| | | | | Tensile strength (p.s.i.×10³) | Elongation (percent) | Modulus (p.s.i.×10⁶) | Percent | | |
| Sample number | Dehydrochlorination agent | Temp. (° C.) | Time (min.) | | | | C | Cl | N |
| 11 | None | | | 41 | 61 | 0.13 | | | |
| 12 | 10% C₃H₇NH₂ in DMSO¹ | 23 | 90 | ² N.D. | N.D. | N.D. | N.D. | N.D. | N.D. |
| 13 | 10% C₃H₇NH₂ in DMSO¹ | 23 | 150 | N.D. | N.D. | N.D. | N.D. | N.D. | N.D. |
| 14 | C₃H₇NH₂ | 23 | 11 | N.D. | N.D. | N.D. | N.D. | N.D. | N.D. |
| 15 | C₃H₇NH₂ | 23 | 10 | 28 | 22 | 0.39 | 39.2 | 56.2 | 1.6 |

¹ DMSO=Dimethylsulfoxide.  ² N.D.=Not Determined.

Each of the polymer filaments designated as Sample Nos. 11 through 15 on Table II supra, were subsequently heated in the presence of nitrogen from a temperature of 90° C. to 1000° C. over a period of about 20 minutes. The filament designated as Sample No. 11 (non-dehydrohalogenated) melted before carbonizing. By way of comparison, each of the filaments designated as Sample Nos. 12 through 15 formed strong, flexible carbon fibers.

Series III

Continuous dehydrochlorination reactions on separate 0.0015 inch diameter 30 filament tow samples of the same copolymer as Series I and II wherein each sample was dehydrochlorinated by being continuously drawn at constant length through a bath of the specified chemical treating compound.

Series III A

Continuous dehydrochlorination as above but fibers allowed to shrink during amine treatment to 52% of initial length.

TABLE I
Batch dehydrochlorination reactions on oriented vinylidene chloride polymer filament (0.010 inch diameter)
Series I

| | Chemical treatment | | | Properties of dehydrochlorinated filament | | | | |
|---|---|---|---|---|---|---|---|---|
| | Dehydrochlorination agent | Temp. (° C.) | Time (min.) | Tensile strength p.s.i. | Elongation | Percent | | |
| Sample number | | | | | | C | Cl | N |
| 1 | None | | | 42 | 23 | | 70.6 | |
| 2 | C₃H₇NH₂ | 23 | 10 | ¹ N.D. | N.D. | N.D. | 63.2 | N.D. |
| 3 | C₃H₇NH₂ | 23 | 20 | 24 | 16 | N.D. | 59.5 | N.D. |
| 4 | C₃H₇NH₂ | 23 | 30 | 20 | 25 | N.D. | N.D. | N.D. |
| 5 | C₃H₇NH₂ | 47 | 0.75 | N.D. | N.D. | N.D. | N.D. | N.D. |
| 6 | C₃H₇NH₂ | 47 | 1 | N.D. | N.D. | N.D. | 59 | N.D. |
| 7 | C₃H₇NH₂ | 47 | 1.5 | N.D. | N.D. | N.D. | N.D. | N.D. |
| 8 | C₃H₇NH₂ | 47 | 2 | N.D. | N.D. | 33.4 | 63.4 | 1.0 |
| 9 | C₃H₇NH₂ | 47 | 3 | N.D. | N.D. | 42.6 | 50.1 | 2.9 |
| 10 | C₄H₉NH₂ | 23 | 15 | N.D. | N.D. | N.D. | N.D. | N.D. |

¹ N.D.=Not Determined.

The following Table III identifies the fiber samples used and the techniques and conditions employed:

TABLE III
Continuous dehydrochlorination reactions on a thirty filament tow vinylidene chloride polymer (0.0015 inch diameter)

Series III

| Sample number | Chemical Treatment | | | Properties of dehydrochlorinated filaments | | | | | |
|---|---|---|---|---|---|---|---|---|---|
| | Dehydrochlorination agent | Temp. (°C.) | Time (min.) | Tensile strength (p.s.i.×10³) | Elongation (percent) | Tensile modulus (p.s.i.×10⁶) | Percent | | |
| | | | | | | | C | Cl | N |
| 16 | $C_3H_7NH_2$ | 23 | 12 | 26 | 25 | 0.42 | 35.6 | 60.2 | 1.0 |
| 17 | $C_3H_7NH_2$ | 23 | 10 | ¹N.D. | N.D. | N.D. | 34.2 | 62.2 | 0.8 |
| 18 | $C_3H_7NH_2$ | 23 | 9 | 37 | 19 | 0.42 | 34.4 | 62.4 | 0.6 |
| 19 | $C_3H_7NH_2$ | 23 | 8.5 | N.D. | N.D. | N.D. | 32.7 | 63.2 | 6.1 |
| 20 | $C_3H_7NH_2$ | 23 | 8.1 | 35 | 23 | 0.51 | 33.1 | 62.6 | 1.1 |

Series III-A

| 21 | $C_3H_7NH_2$ | 23 | 14.3 | N.D. | N.D. | N.D. | 37.9 | 56.8 | 1.7 |
| 22 | $C_3H_7NH_2$ | 23 | 20.8 | 14 | 42 | 0.24 | 55.1 | 35.2 | 4.7 |
| 23 | $C_3H_7NH_2$ | 23 | 25.5 | 10 | 31 | 0.20 | 59.0 | 29.8 | 6.0 |
| 24 | $C_3H_7NH_2$ | 23 | 51.5 | 36 | 23 | 0.60 | 60.7 | 27.6 | 6.2 |

¹ N.D.=Not determined.

Each of the polymer filaments designated as Sample Nos. 16 through 24 of Table III were subsequently heated in the presence of nitrogen from a temperature of from 90° C. to 1000° C. over a period of about 70 minutes and all formed strong, flexible carbon fibers.

The following Table IV sets forth conditions used for carbonization of samples representing the present invention as presented in Table II (Sample No. 15) and Table III (Samples 18 and 20), wherein the partly dehydrochlorinated samples were heated under tension at specified temperatures and time. Table IV A is for a similar series but with a maximum carbonization temperature of 900° C.

TABLE IV
Carbonization of partly dehydrochlorinated vinylidene chloride polymer fibers

| | Sample designation | | |
|---|---|---|---|
| | 25 (sample 15 from Table II) | 26 (sample 18 from Table III) | 27 (sample 20 from Table III) |
| Tension | (¹) | (¹) | (²) |
| Time at 980±20° C. (minutes) | 10 | 10 | 15 |
| Fiber tensile strength (p.s.i. ×10³) | 114 | 73 | 88 |
| Fiber modulus (p.s.i. ×10⁶) | 4.3 | 4.3 | 4.0 |
| Percent carbon | ³N.D. | N.D. | 90.1 |
| Percent chlorine | N.D. | N.D. | 0.5 |
| Percent nitrogen | N.D. | N.D. | 0.8 |

¹ Tension is 10 grams per 30 filament tow.
² Fibers held at constant length by winding around a graphite block with round ends.
³ N.D.=Not Determined.

TABLE IV-A
Carbonization of partly dehydrochlorinated vinylidene chloride polymer fibers

| | Sample Designation | | | |
|---|---|---|---|---|
| | 28 (sample 21 from Table III-A) | 29 (sample 22 from Table III-A) | 30 (sample 23 from Table III-A) | 31 (sample 24 from Table III-A) |
| Tension | (¹) | (¹) | (¹) | (¹) |
| Time at 900° C. (minutes) | 20 | 20 | 20 | 20 |
| Fiber tensile strength (p.s.i. ×10³) | 33 | 37 | 44 | 70 |
| Fiber modulus (p.s.i. ×10⁶) | 1.68 | 1.92 | 2.04 | 2.51 |
| Fiber elongation (percent) | 2.3 | 2.2 | 2.4 | 3.0 |
| Percent carbon | 83.4 | ²N.D. | 84 | N.D. |
| Percent chlorine | 12.9 | N.D. | 10 | N.D. |
| Percent nitrogen | 2.5 | N.D. | 4.3 | N.D. |

¹ Tension is 10 grams per 30 filament tow.
² N.D.=Not Determined.

It will be noted from Table IV A that the carbonized fibers contain significant amounts of nitrogen and chlorine, i.e., even after being heated to 900° C., thus indicating a fiber of previously unknown composition and structure.

The following Table V sets forth the conditions used to graphitize the samples of Table IV, wherein the carbonized fiber is passed through a graphitization furnace.

TABLE V
Graphitization of carbonized vinylidene chloride polymer fibers

| | Sample designation | | |
|---|---|---|---|
| | 32 (sample 25 from Table IV) | 33 (sample 26 from Table IV) | 34 (sample 27 from Table IV) |
| Tension | (¹) | (¹) | (¹) |
| Temp. (° C.) | 2,500 | 2,500 | 2,500 |
| Fiber tensile strength (p.s.i.×10³) | 93 | 96 | 113 |
| Fiber modulus (p.s.i.×10⁶) | 3.9 | 6.2 | 4.5 |
| Fiber elongation (percent) | 2.1 | 1.9 | 2.7 |
| Percent carbon | 99.5 | 100 | 98.9 |

¹ Tension is 10 grams per 30 filament tow.

What is claimed is:

1. A process for preparing a carbonaceous fiber from a vinylidene chloride polymer filament comprising the sequential steps of:
   (1) treating said vinylidene chloride polymer filament with an organic amine having the formula R—$NH_2$ wherein R is alkyl containing from 1 to 4 carbon atoms at a temperature less than about 125° C. in the essential absence of moisture until said filament is from about 25 to 80 percent dehydrohalogenated but without significant loss in filament structural integrity, and
   (2) carbonizing said filament by subjecting the same to a temperature which is increased from an initial value of at least about 90° C. to a final value of up to about 1500° C. over a period of at least 5 minutes.

2. The process of Claim 1 wherein said vinylidene chloride polymer is a copolymer of vinylidene chloride and vinyl chloride.

3. The process of Claim 2 wherein said vinylidene chloride polymer is a copolymer of about 85 weight percent vinylidene chloride and about 15 weight percent of vinyl chloride.

4. The process of Claim 1 wherein said organic amine is selected from the group consisting of propylamine and butyl amine.

5. The process of Claim 1 wherein said filament is carbonized by subjecting the same to a temperature of from about 900° C. to 1000° C. for a period of from about 10 to 20 minutes.

6. The process of Claim 5 wherein said filament is carbonized while in a substantially nonoxidizing environment.

7. The process of Claim 1 containing in addition thereto and in combination therewith the step of graphitizing the carbonized filament by heating said filament to a temperature between about 1500° C. and 3000° C. for a period of at least about 10 seconds.

References Cited

UNITED STATES PATENTS 3,516,791   6/1970   Evans et al. _____ 423—449

FOREIGN PATENTS 2,038,915   2/1971   Germany _____ 423—447

OTHER REFERENCES

Boucher, "Chemical Abstracts," vol. 74, June 28, 1971, 143149u.

Kirk-Othmer Encyclopedia of Chemical Technology, 2nd ed., vol. 21, 1970, pp. 294–295.

Wolkober, "Chemical Abstracts," vol. 62, 1965, 690e.

Boucher et al. (II), "Carbon," vol. 8, No. 5, November 1970, pp. 597–605.

EDWARD J. MEROS, Primary Examiner

U.S. Cl. X.R.

264—29; 423—448, 449